United States Patent
Boesch

[19]

[11] Patent Number: 6,118,369
[45] Date of Patent: Sep. 12, 2000

[54] TIRE DIAGNOSTIC SYSTEM

[75] Inventor: Mathew Alan Boesch, Plymouth, Mich.

[73] Assignee: Ford Motor Company, Dearborn, Mich.

[21] Appl. No.: 09/134,953

[22] Filed: Aug. 17, 1998

[51] Int. Cl.[7] .................................................. B60C 23/00
[52] U.S. Cl. ...................... 340/443; 340/442; 340/444; 340/445; 73/146.2; 73/146.5
[58] Field of Search ........................ 340/442, 443, 340/444, 445, 446, 447, 448; 73/146, 146.2, 146.5, 146.4

[56] References Cited

U.S. PATENT DOCUMENTS

| | | | |
|---|---|---|---|
| 4,893,110 | 1/1990 | Hebert | 340/442 |
| 5,192,929 | 3/1993 | Walker et al. | |
| 5,239,469 | 8/1993 | Walker et al. | |
| 5,546,308 | 8/1996 | Yamamoto | |
| 5,569,848 | 10/1996 | Sharp | |
| 5,578,984 | 11/1996 | Nakajima | |
| 5,606,122 | 2/1997 | Taguchi et al. | 340/448 |
| 5,691,694 | 11/1997 | Horie | 340/442 |
| 5,721,528 | 2/1998 | Boesch et al. | |
| 5,801,305 | 9/1998 | Kawai et al. | 340/448 |
| 5,826,207 | 10/1998 | Ohashi et al. | 701/36 |
| 5,847,645 | 12/1998 | Boesch | 340/442 |
| 5,886,624 | 3/1999 | Hebert | 340/442 |

*Primary Examiner*—Nina Tong

[57] ABSTRACT

A tire diagnostic system and method for detecting an inflation condition of a pneumatic tire on an automotive vehicle includes a method for estimating the inevitable pressure loss of the tire. The method creates the estimate based on a combination of a time since the tire was last set to a nominal value and an operating condition of the vehicle. For example, the estimate can be based on a combination of time and distance traveled since the tire was last set to a nominal value.

14 Claims, 4 Drawing Sheets

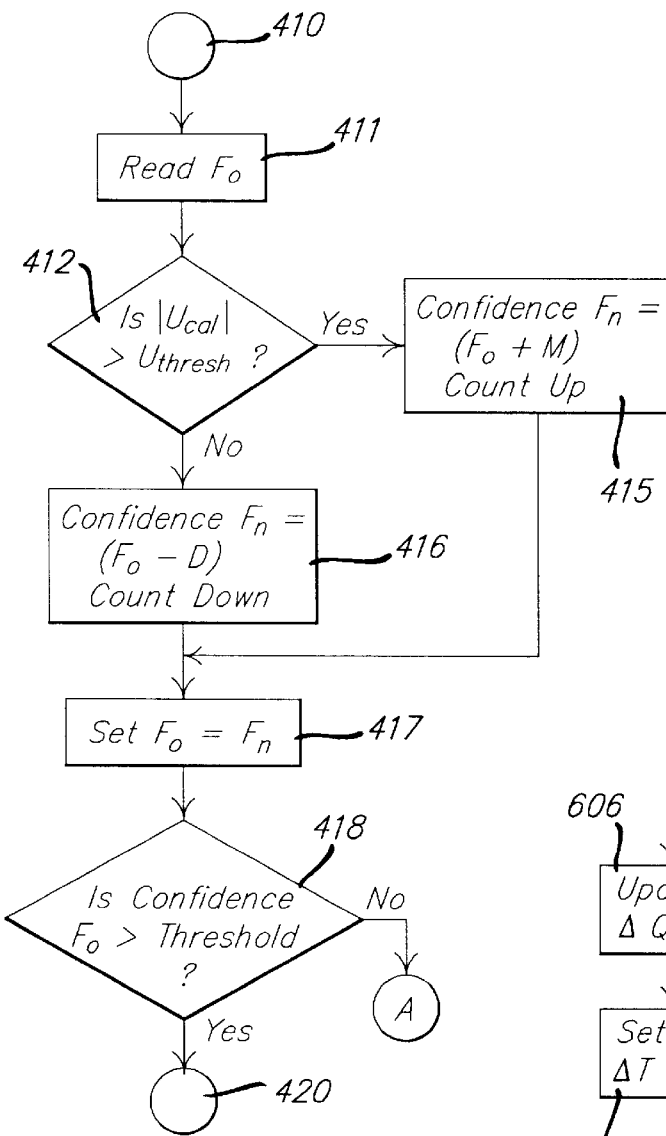
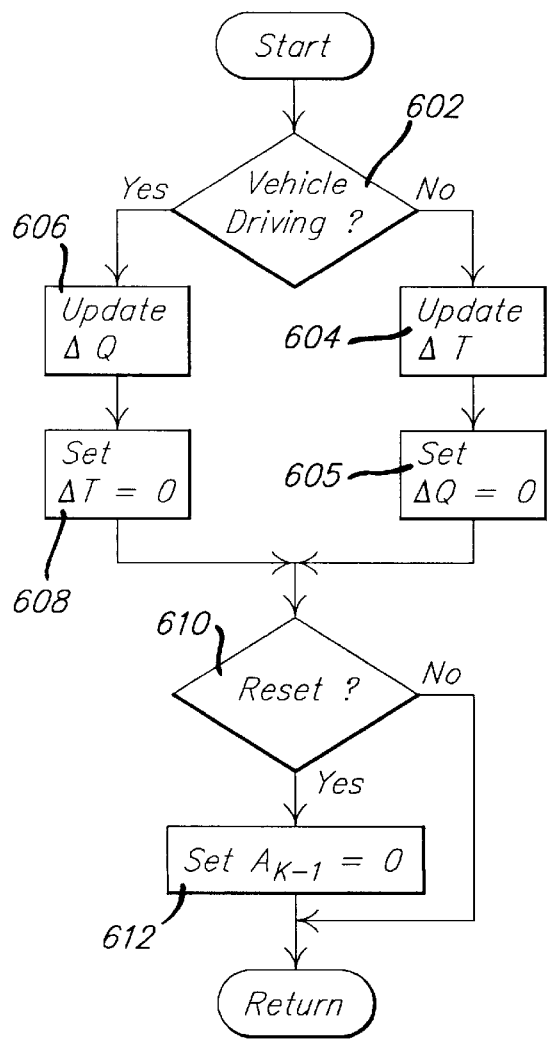
FIG. 4.
FIG. 5.

TIRE DIAGNOSTIC SYSTEM

FIELD OF THE INVENTION

The present invention relates generally to tire pressure diagnostic systems for automotive vehicles.

BACKGROUND OF THE INVENTION

Several low tire detection systems have been described in the literature, including those that monitor tire pressure and profile height. More recently, systems have been described which utilize effective rolling radius calculations to determine when the radius of one of the wheels varies. The generally employed principle of using the effective rolling radius relies on the fact that a wheel with a flat or low pressure tire has an incrementally smaller effective rolling radius than a nominally inflated tire. Often, wheel displacement sensors are used to measure the angular displacement of each wheel. Each of these measurements is related to the effective rolling radius. In this context, the effective rolling radius is defined as the ratio of the true vehicle speed of the center of the wheel divided by the angular velocity or the true forward distance traveled by the center of a wheel divided by the angular displacement measured over this distance.

A previously issued U.S. Pat. No. 5,721,528 by the present inventor, which is incorporated herein by reference, discloses a low tire warning system using wheel speed sensors. This system estimates the vehicle's speed or displacement based on a calculated average of all wheel speeds or displacements, respectively. This previous invention relies on the fact that it is probable that not all tires are in a low inflation condition, and therefore at least some of the tires can be used to estimate the vehicle's speed or displacement. If all tires are equally low, however, no low tire condition may be detected. In addition, the particular tire having the low pressure condition may not be accurately determined.

To prevent the situation where all tires are equally low, periodic warning of a possibility that all tires are low is performed. One method is to measure a period of time which commonly corresponds to the inevitable pressure drop of a tire due to natural factors. For example, a tire generally does not have a perfect seal. Therefore, after a certain elapsed time, the tire will have experienced a pressure drop. Such a system is disclosed in U.S. Pat. No. 5,691,694.

The inventor herein has recognized a disadvantage with the above approach. For example, the correlation between elapsed time and pressure drop is affected by various factors, such as, for example, temperature, atmospheric pressure, vehicle loading, travel distance, and various other conditions. In particular, travel distance has a significant effect on the inevitable tire pressure drop. Thus, a poor correlation between elapsed time and pressure drop is obtained unless other vehicle operation conditions are included.

SUMMARY OF THE INVENTION

An object of the present invention is to warn a driver that there is a possibility that the tires need to be re-pressurized due to inevitable tire pressure loss. This object is achieved, and disadvantages of prior art approaches are overcome, by providing a tire diagnostic method for an automotive vehicle, the vehicle having a plurality of wheels, with each wheel containing a pneumatic tire. The method comprises the steps of measuring a period of time from when a pressure of the tire was set to a nominal value, measuring an operating condition of the vehicle, and estimating a pressure drop of the tire based on said period of time and said operating condition of the vehicle.

By using both the elapsed time and vehicle operating conditions, it is possible to obtain a much more robust estimate of the inevitable pressure loss of pneumatic tires. For example, a car that has been parked for six months may experience the same pressure loss as a car that has driven 12,000 miles in 2 months.

An advantage of the present invention is a more reliable low pressure tire warning system.

Another advantage of the present invention a more accurate low pressure tire warning system.

Other objects, features and advantages of the present invention will be readily appreciated by the reader of this specification.

BRIEF DESCRIPTION OF THE DRAWINGS

The invention will now be described, by way of example, with reference to the accompanying drawings, in which:

FIG. 4 is a detailed flow diagram of the low tire confidence determination step shown in FIG. 3B;

FIG. 6 is a detailed flow diagram of the information used in FIG. 5.

DETAILED DESCRIPTION OF THE PREFERRED EMBODIMENTS

Figure 1:
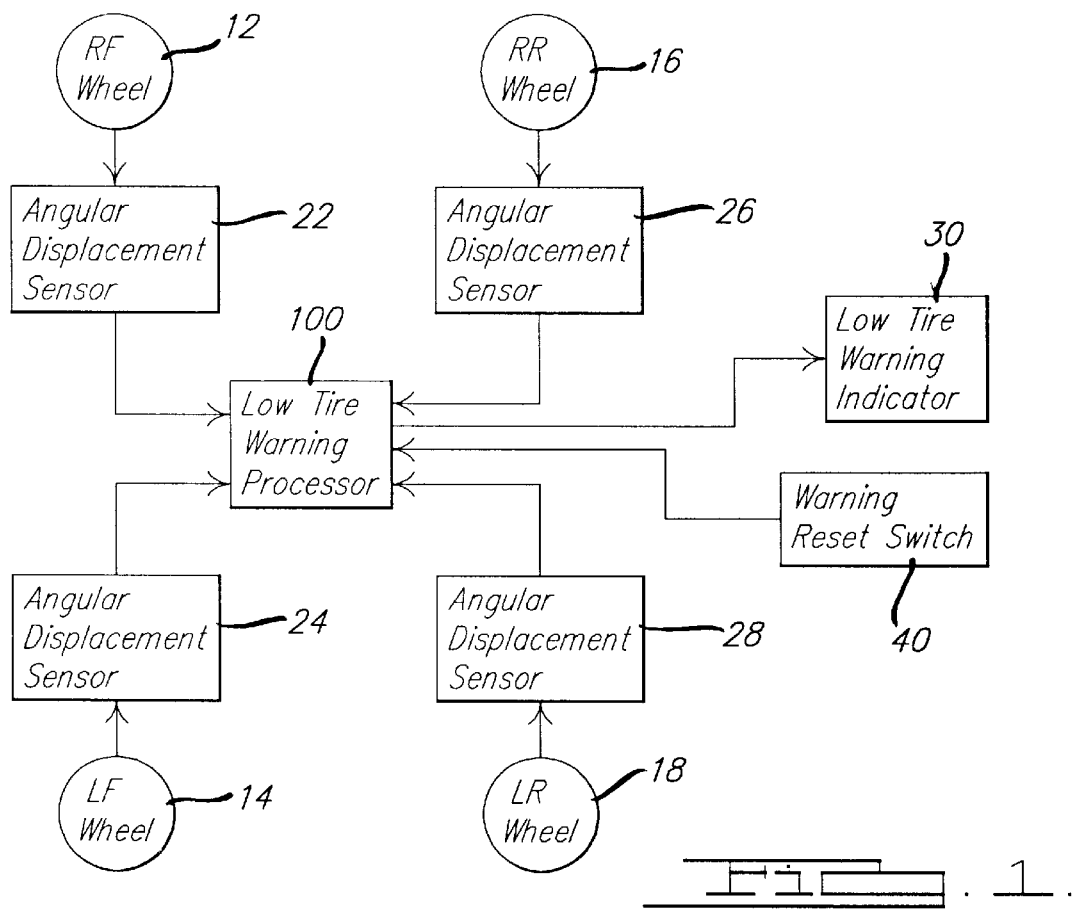
FIG. 1 is an overall architecture diagram showing the hardware used for the low tire warning system of the present invention.

A typical hardware arrangement is shown in FIG. 1. Here, the right front, the left front, the right rear and left rear wheels are represented as 12, 14, 16 and 18, respectively. The rotation of those wheels are sensed by corresponding angular displacement sensors 22, 24, 26 and 28. Each sensor outputs a variable frequency signal which is directly related to the rotational speed of the wheel and the number of teeth (typically 50) on the sensor. The rotation signals are then input to a low tire warning processor 100. Processor 100 repetitively executes an algorithm which evaluates the wheel rotation signals, and provides a signal to activate a warning indicator 30 to alert the driver when a low tire is detected. A warning reset switch 40 is also represented to deactivate the warning indicator, after service is made for the low tire problem.

Figures 2, 3A:
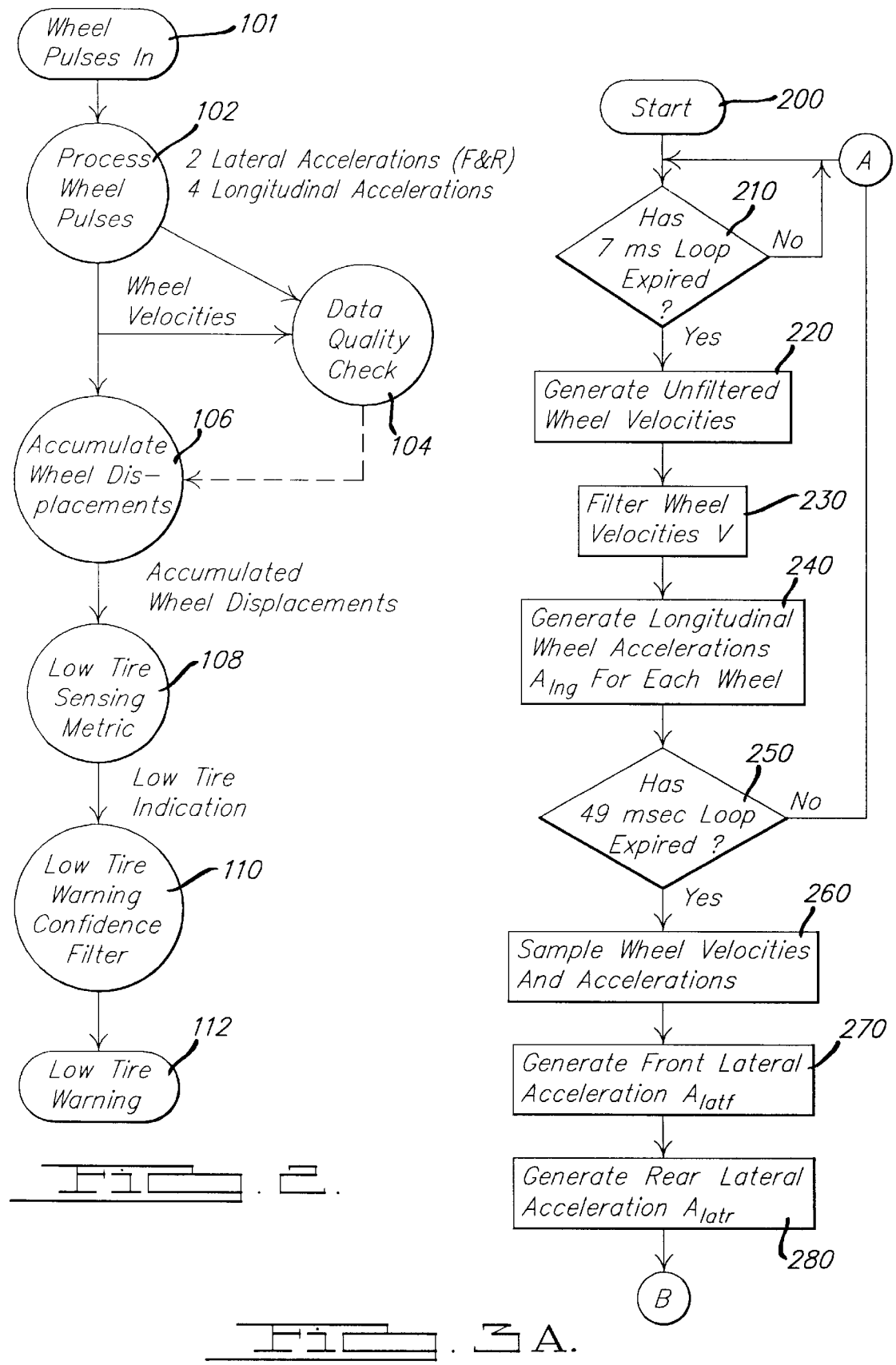
FIG. 2 is an abstract representation of essential data flows in the low tire warning processor.
FIG. 3A and FIG. 3B constitute a detailed flow diagram for the preferred embodiment of the algorithm employed in the low tire warning processor.

FIG. 2 presents a high level description of the function of the algorithm which is executed within the low tire warning processor 100 of FIG. 1, and showing essential data flows of the algorithm.

The wheel speed pulses are input at step 101 to a "process wheel pulses" process 102. The zero crossings of these pulses are monitored over a relatively short sampling periods to derive sampling velocity values for each wheel. Those velocity values are then filtered over relatively longer predetermined sampling period to provide estimates of individual wheel velocities. The estimated wheel velocities are further filtered to provide estimates of individual longitudinal wheel accelerations, as well as lateral accelerations for the front pair of wheels and for the rear pair of wheels.

The velocity values and acceleration values are compared against predetermined levels to determine if they are acceptable for further processing, in the "data quality check" process 104. Process 104 determines if the operating conditions of the vehicle are suitable for the system to accept the velocity and acceleration values. If accepted, a "data valid" signal enables an "accumulate wheel displacement" process 106. When enabled, process 106 accepts wheel velocity values for each wheel, determines displacement values and accumulates wheel displacement values until a predetermined distance is determined to have been traveled by any wheel. After collecting valid wheel velocity data over a required distance, the total wheel displacement values are each passed to the "low tire pressure sensing metric" process 108, and the accumulators used in process 106 are zeroed (not shown).

The low tire pressure sensing metric process 108 utilizes a unique algorithm which subtracts the difference of the accumulated displacement values between the rear wheels divided by their mean displacement from the accumulated displacement values between the front wheels divided by their mean displacement. This processing of the individual wheel displacements determines if a low tire pressure condition exists for a tire. The calculated metric is then compared with a predetermined baseline metric to determine an absolute value of a calibrated metric. The absolute value of the calibrated metric is then processed in a "low tire warning confidence filter" process 110.

In process 110, the absolute value of the calibrated metric is compared with a predetermined threshold value which is determined as an acceptable range of values equally above and below the baseline value. This is based on the presumption that the metric must differ sufficiently from the established baseline metric to confirm that the metric value indeed indicates a low tire condition. If the calibrated metric does exceed the predetermined threshold, a low tire condition is determined. That occurrence is then accumulated until there is a sufficient number of such occurrences to provide confidence that a low tire condition has been consistently detected and a warning should be given at process 112.

In process 112, a warning indicator notifies the driver to check the tires. After checking the tires, the tire condition which caused the warning (such as low pressure) should be corrected. That done, the driver or the service technician should reset the system so that the baseline may be updated according to a filtering process that reflects the metric value when tire pressures are deemed acceptable to the driver.

It should be noted that while the sensing metric process of FIG. 2 is described in such a way as to sense a single low tire, it may also be capable of sensing two diagonal low tires, any combination of 3 low tires, and any combination of two low tires as long as the tires do not lose pressure at exactly the same rate. In those instances, the higher the metric's absolute value, the more likely it is that a low tire condition exists.

Figure 3B:
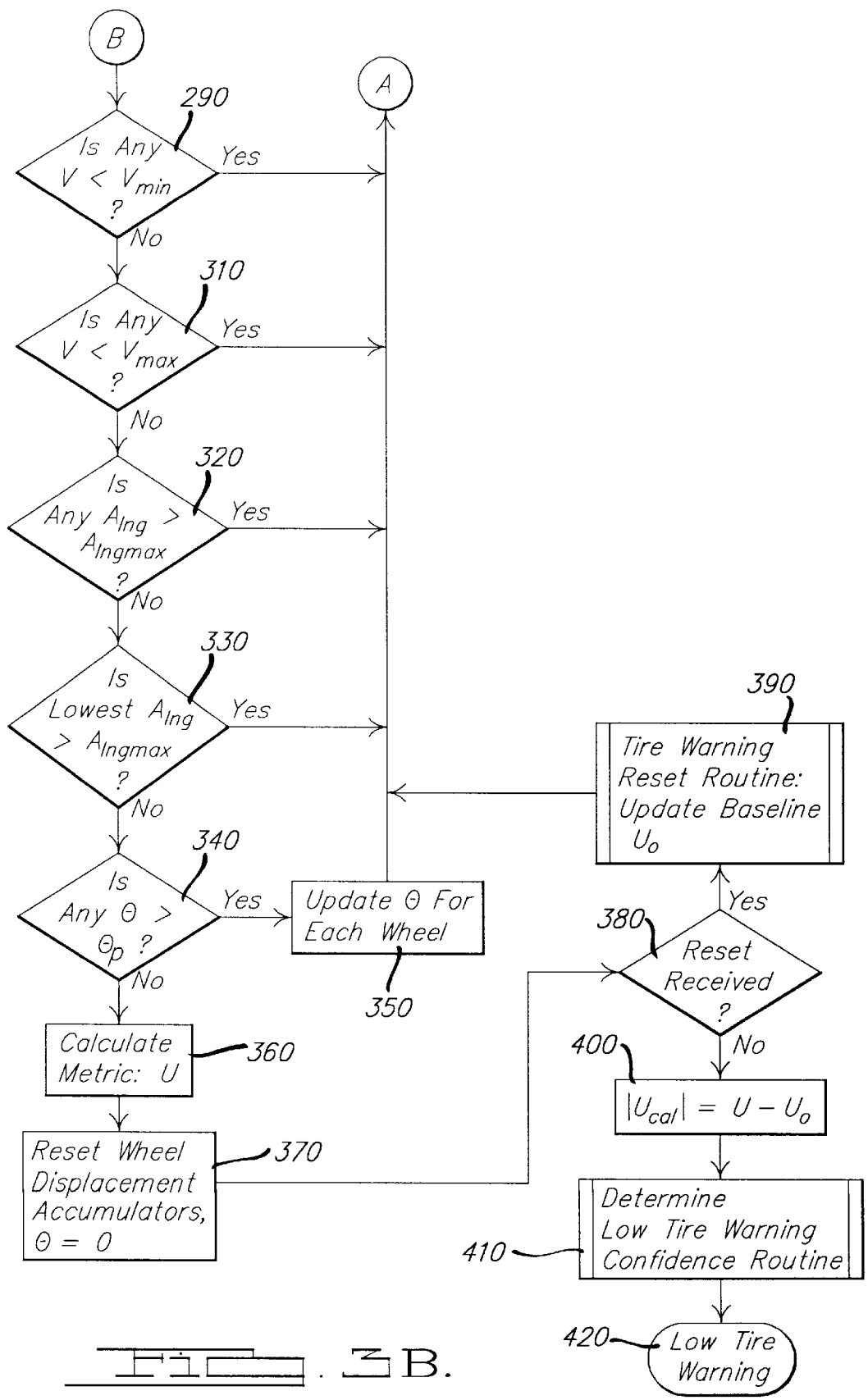

FIGS. 3A and 3B constitute a flowchart which presents a more detailed description of the process which is executed within the low tire warning processor 100 of FIG. 1, and which is summarized in the above description of FIG. 2. Although not shown, it should be noted that a conventional counter/timer processing unit can be used to process the individual wheel rotation signals from the angular rotation sensors 22, 24, 26 and 28 shown in FIG. 1 and gathered over a relatively short time period. Rotations are sensed by using conventional ABS sensors with "tone rings" emitting typically 100 signal transitions per wheel revolution. In this case, a relatively short time period of 7 msec was selected. Such a processing unit should generate an accumulated zero-crossings signal for each wheel, and an elapsed time signal. This information is in turn gathered by the process of FIG. 3A approximately every 7 msec.) Following the start 200, a relatively short time period of 7 msec. is established at loop step 210 in which to sample rotational zero-crossing accumulations and generate unfiltered wheel velocity values in step 220. Step 220 can be performed in any conventional manner.

The four unfiltered wheel velocity values are then processed at step 230 every 7 msec. using a digital low pass filtering and scaling technique according to the relationship:

$Vk = \alpha(Vk-1) + (1-\alpha)(\mu k)$, wherein Vk becomes the filtered velocity value for the most recent of k samples (in this case 7 samples in any 49 msec. sampling period);

$\alpha$ is a constant having a value that is less than 1;

Vk−1 is the filtered velocity value for the sampling immediately preceding the most recent sampling; and $\mu k$ is the sensed angular rotation rate for the most recent 7 msec. sampling.

This filtering technique produces a smoothed value for each wheel and is termed as filtered wheel velocity values $V_w$ for each wheel. (i.e., $V_{wfl}$ is the filtered wheel velocity value calculated for the front left wheel; $V_{wfr}$ is for the front right wheel; $V_{wrl}$ is for the rear left wheel; and $V_{wrr}$ is for the rear right wheel.)

In step 240, a high pass filtering technique is used every 7 msec. to generate four longitudinal wheel acceleration signals $A_{lng}$ according to the relationship:

$A_{lng} k = \delta(A_{lng}k-1) + \beta[Vk-Vk-1]$, wherein $\delta$ is a constant, less than 1;

$\beta$ is a constant;

Vk is the most recently calculated filtered velocity;

Vk−1 is the calculated filtered velocity for the sampling immediately preceding the most recent sampling; and $A_{lng\ k-1}$ is the longitudinal acceleration value for the sampling immediately preceding the most recent sampling.

The steps performed at 220, 230 and 240 are repeated until 49 msec has been determined as expired in step 250. When this predetermined sampling period has expired, the filtered velocities and longitudinal acceleration values for each wheel are sampled at step 260 as $V_w$ and $A_{lng}$ values for each of the four wheels.

In step 270, a front lateral acceleration value $A_{latf}$ is generated for the front pair of wheels. In step 280, a rear lateral acceleration value $A_{latr}$ is generated for the rear pair of wheels. For each pair of wheels the respective steps 270 and 280 are performed by using a filter technique according to the relationships:

$A_{latf} = \kappa(V_{wfl} - V_{wfr})(V_{wfl} + V_{wfr})$ and $A_{latr} = \kappa(V_{wrl} - V_{wrr})(V_{wrl} + V_{wrr})$, wherein $\kappa$ is a constant;

$V_{wfl}$, $V_{wfr}$, $V_{wrl}$ and $V_{wrr}$ are as described above.

After the lateral acceleration values have been generated, all the velocity and acceleration values are processed for data quality in steps 290–330 (FIG. 3B).

In step 290, each sampled velocity value $V_{wfl}$, $V_{wfr}$, $V_{wrl}$, and $V_{wrr}$ is compared with a predetermined minimum acceptable velocity value $V_{min}$ to determine if the sampled velocity is at an acceptable level. In this embodiment, $V_{min}$ is selected as approximately 5 mph or 8 kph. If any velocity value is below the minimum acceptable velocity value, the data is rejected and further processing with that data is prevented. However, if all four of the sampled velocity values are higher than the minimum acceptable value, they are then compared against a predetermined maximum acceptable velocity value $V_{max}$ in step 310. In this embodiment, $V_{max}$ is selected as approximately 100 mph (161 kph). If any velocity value is greater than the maximum acceptable velocity value, the data is rejected as unreliable because of the factors discussed above and further processing with that data is prevented.

In step 320, all four of the longitudinal acceleration values $A_{lng}$ are compared with a predetermined maximum acceptable longitudinal acceleration value $A_{lngmax}$. If any of the longitudinal acceleration values $A_{lng}$ are greater than the predetermined maximum acceptable longitudinal acceleration value $A_{lngmax}$, further processing of that data is prevented. This allows further processing only if there is no excessive longitudinal acceleration detected in any wheel, that may be due to braking, slipping or rapid application of wheel torque, as discussed above.

If the longitudinal acceleration data is acceptable, the smallest lateral acceleration value $A_{lat}$ of those generated in step 270 and 280 is compared with a predetermined maximum acceptable lateral acceleration value $A_{latmax}$. The smaller value of $A_{lat}$ is selected for comparison because the occurrence of a low pressure tire will result in one of the two values of $A_{lat}$ to be higher than the other one. Therefore, in order to ensure that data indicative of a low tire will be further processed, it is prudent to validate both values of $A_{lat}$.

Once the data has been validated, the estimated displacement θ accumulation for each wheel is compared with a predetermined displacement value $θ_p$. When the accumulated displacement for any wheel exceeds $θ_p$, a metric is calculated in step 360. However, if the accumulated displacement values for all wheels is below $θ_p$, the θ for each wheel is updated in step 350 and more data is collected. In step 350, the displacement values are updated according to the relationship of:

θ=∫$V_w$(dt), for each wheel.

1In step 360, the metric "U" is calculated according to the relationship:

U=((θfl−$\overline{θflθfr}$)/θflθfr)−((θrl−θrr)/θrlθrr), wherein

θfl is the front left wheel accumulated displacement value,

θfr is the front right wheel accumulated displacement value, $\overline{θflθfr}$ is the mean value of θfl and θfr, θrl is the rear left wheel accumulated displacement value, θrr is the rear right wheel accumulated displacement value, and $\overline{θrlθrr}$ is the mean value of θrl and θrr.

In the metric U, a difference between the displacement values of the paired wheels, is a direct reflection of the difference between effective rolling radii of those wheels and can be attributed to one tire having changed because of loss of air pressure. The metric is selected to accentuate the effect caused by the low pressure tire, by comparing the differences in displacements in each pair of wheels, front and back. If the difference in the effective rolling radii remains unchanged, then the calculated metric will remain low and be of no significance.

After the metric U is calculated, the displacement accumulators are reset to zero in step 370.

In step 380, the process looks to see if a reset signal has been received. As discussed above, such a signal would be provided following service to correct a previously detected low tire condition. In addition, the reset signal may be provided as part of a regular maintenance routine in which all the tires are rotated, any tires are replaced, or any inflation is adjusted. If such a reset signal were detected at step 380, a tire warning reset routine 390 would be performed to update a baseline metric $U_0$ from future metric measurements.

The tire warning reset routine 390 updates a baseline metric value $U_0$ when the tire pressure conditions are thought to be acceptable to the driver or tire mechanic. A reset is requested by activating the warning reset switch 40 in FIG. 1. Although the baseline metric $U_0$ will not be updated immediately, the processor 100 will immediately inhibit the low tire warning indicator 30.

The baseline value $U_0$ is based upon an average value of the tire warning metric U. The particular averaging means may be any of the following: a batch average for a chosen fixed number of metric U updates; a low pass filtered value of metric U updates taken over a fixed chosen time interval; or a low pass filtered value of metric U updates taken over a self-adapting time interval, with the interval period automatically adjusted until a performance criteria on the maximum acceptable variance of $U_0$ is met. The parameters of the selected averaging method are fine-tuned for the particular vehicle and tire combination.

In step 400, the calculated metric U is compared with the predetermined baseline metric $U_0$ to derive an absolute value of the difference. This value is referred to as the calibrated metric l$U_{cal}$l. The calibrated metric is then processed in a low tire warning confidence routine 410, shown in FIG. 4. If the confidence level is determined in routine 410 to be sufficiently high, the low tire warning will be activated in step 420.

In FIG. 4, the routine is shown for determining if the calibrated metric l$U_{cal}$l is sufficient to indicate that a low tire condition is detected, and when a sufficient number of such detections occur to provide assurance that a low tire condition actually exists.

An accumulation of sufficiently high values of l$U_{cal}$l is made in routine 410 and are represented by a confidence factor $F_o$. At step 411, $F_o$ is read. In step 412, the calibrated metric l$U_{cal}$l is compared with a predetermined calibrated metric threshold value $U_{thresh}$. If the comparison in step 412 determines that l$U_{cal}$l exceeds $U_{thresh}$, an updated confidence factor $F_n$ is calculated in step 415 by incrementing the confidence factor $F_o$ read in step 411 by a predetermined increment factor M. In this case, M is and an integer, but may be a constant, or a variable based on conditions selected by one who implements the invention. After step 415, confidence factor $F_o$ is set equal to updated confidence factor $F_n$ in step 417.

In step 416, the updated confidence factor $F_n$ is determined by decrementing the confidence factor $F_o$ by a predetermined decrement factor D, when the calibrated metric l$U_{cal}$l is determined in step 416 to be below the calibrated metric threshold value $U_{thresh}$. In this case, D is and an integer, but may be a constant, or a variable based on conditions selected by one who implements the invention. In this embodiment, the use of a decrementing step to offset the incrementing step, means that the building of a confidence factor to a predetermined threshold value may take longer, but the confidence in the determination of a low tire condition will be stronger and less likely to give false warnings.

As an alternative to the count down of the confidence factor $F_n$ in step 416, that step can be eliminated in favor of step 415 alone. If the factor M is carefully determined, the appropriate confidence level can be reached.

In step 418, the confidence factor $F_o$ from step 417 is compared with a predetermined confidence threshold to determine if the system has sufficient confidence to provide a warning to the vehicle operator that a low tire condition exists and that service should be performed to correct the condition.

Figure 5:
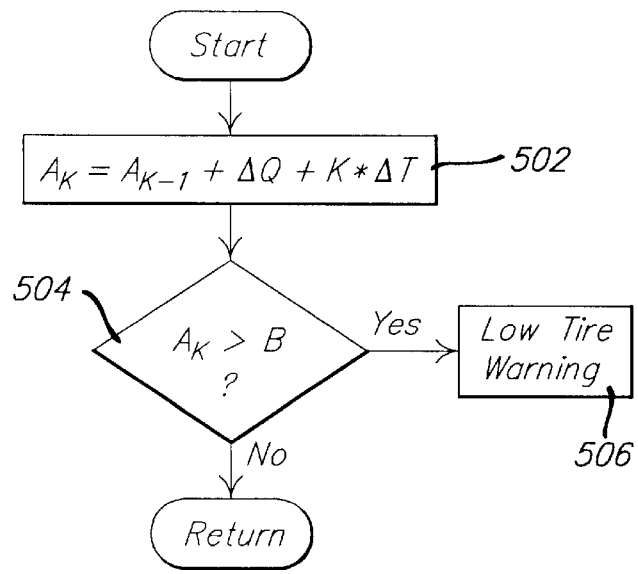
FIG. 5 is a detailed flow diagram of the inevitable pressure loss calculation.

According to the present invention, referring now to FIGS. 5 and 6, the routines for estimating the inevitable pressure loss of the tires is described. The tires will inevitably loose pressure because of imperfections in the tire seal, imperfections in the valve, and various other leaks. This inevitable pressure loss can affected by various environmental conditions, vehicle operating conditions, and elapsed time. The environmental factors may include ambient pressure, ambient temperature, ambient humidity, or any other factor known to those skilled in the art and suggested by this disclosure which affect the inevitable pressure loss of a pneumatic tire. The vehicle operating conditions may include distance traveled, vehicle speed, or any other vehicle operating condition known to those skilled in the art and suggested by this disclosure which affect the inevitable pressure loss of a pneumatic tire.

Referring now specifically to FIG. 5, according to the present invention, in step 502, the current estimated pressure loss factor, $A_k$, is calculated based on the previous estimated pressure loss factor, $A_{k-1}$, the incremental time the car has not been traveling, DT, multiplied by factor K, and the incremental distance the car has traveled, DQ. Then, in step 504, a determination is made whether the current estimated pressure loss factor, $A_k$ is greater than a predetermined threshold, B. When $A_k$ is greater than B, the routine continues to step 506 and activates the low tire warning indicator 30.

Referring now to FIG. 6, the routine for updating the incremental time the car has not been traveling, DT, and the incremental distance the car has traveled, DQ, is now described. In step 602, when the vehicle is not in a driving condition, such as, for example, when the car is parked, the incremental time the car has not been traveling, DT, is updated with the time since the last update (step 604). Then, in step 605, the incremental distance the car has traveled, DQ, is set to zero. Otherwise, in step 606, the incremental distance the car has traveled, DQ, is updated with the distance traveled since the last update. Then, in step 608, incremental time the car has not been traveling, DT, is set to zero. The routine then continues to step 610, where it is determined whether a reset has been received. When a reset is received, the routine continues to step 612, where the previous estimated pressure loss factor, $A_{k-1}$, is set to zero.

While the best mode for carrying out the invention has been described in detail, those skilled in the art in which this invention relates will recognize various alternative designs and embodiments, including those mentioned above, in practicing the invention that has been defined by the following claims. For example, the embodiment described herein specifically referred to using a distance traveled to update the inevitable pressure loss estimation. However, those skilled in the art will recognize in view of this disclosure that many other vehicle operating conditions may be used to estimate inevitable pressure loss of a tire, such as, for example, vehicle speed, wheel torque, tire temperature, or any other vehicle operating condition known to those skilled in the art to affect tire pressure loss. Also, environmental conditions may be used to estimate tire pressure loss, such as, for example, ambient temperature, ambient pressure, or any other environmental condition known to those skilled in the art to affect tire pressure loss. Accordingly, as used herein, ambient temperature, ambient pressure, or any other related parameters or any combination thereof, is referred to as "an environmental related parameter." In addition, wheel speed may be substituted for wheel displacement to detect the improperly inflated tire. Accordingly, as used herein, velocity, displacement, acceleration or any combination thereof is referred to as "a distance related parameter".

I claim:

1. A tire diagnostic method for an automotive vehicle, the vehicle having a plurality of wheels, with each wheel containing a pneumatic tire, with said method comprising the steps of:

measuring a period of time since a pressure of the tire was set to a nominal value;

measuring an operating condition of the vehicle; and estimating a pressure drop of the tire based on said period of time and said operating condition of the vehicle and issuing a warning signal when the estimated pressure is an abnormal tire pressure.

2. The method recited in claim 1 further comprising the step of creating the warning signal when said estimated pressure drop is greater than a predetermined value.

3. The method recited in claim 1 wherein said operating condition of the vehicle is a distance related parameter.

4. The method recited in claim 3 wherein said operating condition of the vehicle is a distance traveled by the vehicle since said pressure of the tire was set to said nominal value.

5. The method recited in claim 1 wherein said estimating step further comprises the steps of:

measuring an environmental related parameter; and modifying said estimated pressure drop based on said environmental related parameter.

6. The method recited in claim 5 wherein said environmental related parameter comprises ambient temperature.

7. A tire diagnostic method for an automotive vehicle, the vehicle having a plurality of wheels, with each wheel containing a pneumatic tire, with said method comprising the steps of:

measuring a period of time since a pressure of the tire was set to a nominal value;

measuring a distance traveled by the vehicle since said pressure of the tire was set to said nominal value;

estimating a pressure drop of the tire based on said period of time and said distance; and creating a warning signal when said estimated pressure drop is greater than a first predetermined value.

8. The method recited in claim 7 wherein said estimating step further comprises the step of estimating said pressure drop of the tire based on an addition of said distance traveled by the vehicle and said period of time.

9. The method recited in claim 8 wherein said estimating step further comprises the step of estimating said pressure drop of the tire based on an addition of said distance traveled by the vehicle and a second predetermined factor multiplied by said period of time.

10. A tire diagnostic system for an automotive vehicle, the vehicle having a plurality of wheels, with each wheel containing a pneumatic tire, with said system comprising:

a sensor for measuring an operating condition of the vehicle;

an indicator to alert a driver when a low tire condition is possible;

a controller for measuring a period of time since a pressure of the tire was set to a nominal value, reading an operating condition of the vehicle from said sensor, estimating a pressure drop of the tire based on said period of time and said operating condition of the vehicle, and sending a warning signal to said indicator when said estimated pressure drop is greater than a first predetermined value.

11. The system recited in claim 10 further comprising a reset switch to deactivate said indicator after said pressure of the tire is reset to said nominal value.

12. The system recited in claim 10 wherein said operating condition of the vehicle is a distance traveled by the vehicle since said pressure of the tire was set to said nominal value.

13. The system recited in claim 10 wherein said controller further estimates said pressure drop of the tire based on an addition of said period of time and a second predetermined factor multiplied by said operating condition of the vehicle.

14. The system recited in claim 13 wherein said operating condition of the vehicle is a distance traveled by the vehicle from when said pressure of the tire was set to said nominal value.

* * * * *